(12) United States Patent
Dolezych

(10) Patent No.: US 12,084,810 B2
(45) Date of Patent: Sep. 10, 2024

(54) HEAVY-DUTY HOIST CHAIN

(71) Applicant: WESTDEUTSCHER DRAHTSEIL-VER-KAUF DOLEZYCH GMBH & CO. KG, Dortmund (DE)

(72) Inventor: Tim Dolezych, Dortmund (DE)

(73) Assignee: WESTDEUTSCHER DRAHTSEIL-VERKAUF DOLEZYCM, Dortmund (DE)

( * ) Notice: Subject to any disclaimer, the term of this patent is extended or adjusted under 35 U.S.C. 154(b) by 470 days.

(21) Appl. No.: 17/274,199

(22) PCT Filed: Oct. 2, 2019

(86) PCT No.: PCT/EP2019/076779
§ 371 (c)(1),
(2) Date: Mar. 20, 2021

(87) PCT Pub. No.: WO2020/070230
PCT Pub. Date: Apr. 9, 2020

(65) Prior Publication Data
US 2021/0356018 A1     Nov. 18, 2021

(30) Foreign Application Priority Data
Oct. 5, 2018 (DE) .......................... 202018105723.5

(51) Int. Cl.
*D07B 7/16* (2006.01)
*D07B 5/00* (2006.01)
*D07B 5/04* (2006.01)
*F16G 13/12* (2006.01)
*F16G 15/12* (2006.01)

(52) U.S. Cl.
CPC ............... *D07B 7/165* (2013.01); *D07B 5/04* (2013.01); *F16G 13/12* (2013.01); *F16G 15/12* (2013.01); *D07B 2201/1004* (2013.01)

(58) Field of Classification Search
CPC ........... F16G 13/12; F16G 15/12; D07B 5/04; D07B 2201/1004
See application file for complete search history.

(56) References Cited

U.S. PATENT DOCUMENTS

| 510,134 | A | 12/1893 | Harris |
| 4,463,782 | A | 8/1984 | Borel |
| 5,578,374 | A | 11/1996 | Dunbar |
| 8,171,714 | B2 | 5/2012 | Wienke |
| 8,215,094 | B2 | 7/2012 | Wienke |
| 8,468,793 | B2 | 6/2013 | Wienke |
| 11,181,169 | B2 * | 11/2021 | Wetzels ............ F16G 15/12 |
| 2010/0077718 | A1 * | 4/2010 | Wienke ............ D07B 5/005 |
| | | | 140/108 |
| 2011/0011051 | A1 * | 1/2011 | Wienke ............ F16G 13/12 |
| | | | 59/84 |
| 2015/0147509 | A1 | 5/2015 | Bosman |
| 2018/0127900 | A1 | 5/2018 | Bosman |
| 2019/0304568 | A1 | 10/2019 | Wetzels |

FOREIGN PATENT DOCUMENTS

| DE | 7930165 U | 1/1980 |
| DE | 9209857 U | 12/1992 |
| DE | 69706465 U | 4/1997 |
| EP | 1063449 A | 12/2000 |
| JP | 5746583 U | 3/1982 |

* cited by examiner

*Primary Examiner* — Mohammed S. Alawadi
(74) *Attorney, Agent, or Firm* — Andrew Wilford

(57) ABSTRACT

A chain has interconnected links each formed by at least one endlessly and continuously circularly woven sheath of tubular shape and circular cross section made of plastic warp yarns and plastic weft yarns surrounding a core. These plastic warp and weft yarns are made of filaments of high tensile strength with a fineness-related maximum tensile strength of at least 5 cN/dtex.

9 Claims, 3 Drawing Sheets

HEAVY-DUTY HOIST CHAIN

CROSS REFERENCE TO RELATED APPLICATIONS

This application is the US-national stage of PCT application PCT/EP2019/076779 filed 2 Oct. 2019 and claiming the priority of German patent application 202018105723.5 itself filed 5 Oct. 2018.

FIELD OF THE INVENTION

The invention relates to a chain, in particular a heavy-duty chain with a plurality of interconnected links each made of plastic yarns.

BACKGROUND OF THE INVENTION

In practice, heavy-duty chains are often used, the links of which are made of steel. In addition, there are more chains nowadays, especially heavy-duty chains that are made up of plastic filaments, as is generally described in EP 2 122 194 (U.S. Pat. Nos. 8,171,714 and 8,215,094). Such a chain is suitably is used to moor or anchor boats, lashing down cargo for road, rail, water and air transport as well as for transportation, elevator, suspension and lifting applications. For this purpose the links are made up of multifilament yarns that are formed by polyolefin multifilament yarns.

There are also other chains whose links are made up of short fibers adhesively connected to one another. Such a chain as described in EP 1 063 449 is complex in terms of its manufacture.

EP 2 858 936 (US 2015/0147509) finally describes a textile chain in which the individual links are made from strips, which in turn are made as, for example, tape woven of plastic filaments. This creates strips that are multiples of 180E can be rotated about its respective longitudinal axis. This creates a closed loop that as a whole defines a link.

As a result of this manufacture, however, the breaking strength is generally reduced. That is to say, the forces that can be transferred through such a chain, and thus the breaking strength is reduced compared to an untwisted ring, which is reflected in the ultimately, this can be traced back to so-called constriction losses.

In fact the connection of the rings with each other at coupling points leads to constrictions of the plastic tape, which reduce the maximum possible breaking strength. In effect here constriction losses of up to 50% compared to an untwisted ring were observed. The invention aims to provide a remedy here overall.

OBJECT OF THE INVENTION

The object of the invention is to make such a change whose breaking strength is improved and where constriction losses are reduced as much as possible to a minimum.

SUMMARY OF THE INVENTION

To attain this object, a generic chain within the scope of invention is characterized in that each link as at least one endlessly laid ring made of laid rope on the basis of plastic filaments. In particular each link is a so-called grommet or a rope annulus, that is at least one endlessly worked ring of laid rope. The rope constructions will in turn be made of at least one or two ropes that are twisted around each other helically. As a result, the additional space required in the center for a core can mostly be dispensed with. As a rule, at least four and in particular six or more ropes are used, each twisted continuously helically around one another to in this way form the rope, which in turn forms the endless ring itself constituting the link.

For its part, the procedure is such that the ends of the ropes are under an outer layer of outer ropes of the rope in the direction of lay. That is how each link defines a grommet or a homogeneous ring from the beaten rope, which can for example be hung in a hook for lifting loads. In addition, the individual links or grommet directly interlock to form the chain. Basically it is also possible that the links do not interlock, but rather are chained together by additional connectors.

These connectors can be metallic hooks or rings of plastic belts or comparable annular connectors. Also the chain according to the invention can be shortened particularly easily in order to adapt to the respective purposes of use. For example, so-called shortening load hooks can be used or appropriately designed ratchets or chain tensioners that enable a corresponding shortening of the chain in that individual links define an unloaded loop.

According to the invention, the rope is woven and, in particular, with circularly woven and formed from plastic yarns. The plastic yarns in turn are formed by plastic filaments that are processed into the rope and are regularly twisted. With such a woven and in particular circularly woven rope is accordingly composed of warp and weft yarns as like any other woven product. The overall design is such that the warp yarns run predominantly in the circumferential direction of the ring. The weft yarns run on the other hand transversely to this, mostly radially of the ring. The circular or circular the cross section of the individual rope is realized and used in such a way that the warp yarns define different layers of the structure. A circular or almost circular cross-section of the woven and, in particular, circularly woven rope can now be used, for example when the weft filaments have the same diameter with different numbers in the various layers so that the desired circle or disk-like determines the cross-section of the rope.

However, it is also possible for the warp yarns to have different diameters. In this regard for example outer layers of the warp yarns have a larger diameter than inner layers of the circular cross section of the rope. In contrast, weft yarns that connect with one another generally are of the same diameter. This way the weft yarns in question not join together the warp yarns of a layer, but also the at least two or more layers of the circular fabric with one another, all done by a circular weaving device as described in principle in EP 0 059 483 (U.S. Pat. No. 4,463,782). Express reference is made to the description therein.

Recourse is known to a circularly woven rope made in the course of a single or double tube weaving process. That is, the circularly woven rope has an outer woven tube made of warp and weft yarns. The tubular fabric can in turn, be designed with one or more layers. In addition, the tubular fabric can be used with a sheathed inlay. The insert core may be plastic web. Other inserts are also conceivable.

In any case, the invention advantageously makes use of a woven and, in particular, circularly woven rope of plastic filaments, whereby the round cross-sectional shape of the rope is determined by use of a tubular round fabric sheath and possibly an insert. The tubular fabric can in principle also be designed with multiple layers.

The woven or circularly woven rope produced in this way can now be made in turn by warp yarns running in the longitudinal direction (including those connecting them weft yarns) and stranded with one another, that is to say extending helically around a central axis of rotational symmetry. This means that at the end of this process there is a single rope or circularly woven rope made of the relevant plastic filaments.

The individual filaments or plastic yarns of the rope, i.e. both the warp yarns and the weft yarns are each designed as multifilament yarns made from plastic filaments. At these multifilament yarns are each made of the plastic filaments they exist of practically unlimited length. In order now to make from the plastic filaments of unlimited length the multifilament yarns for the production of the respective warp and weft yarns, the individual plastic filaments are twisted together, for example. It is also possible that the plastic filaments are formed by twisting to get the necessary cohesion for the realization of the filaments. Since multifilament yarns are used at this point, these consist of a large number of plastic filaments, typically more than ten plastic filaments, with up to 40 or 50 plastic filaments per yarns or even more.

Recourse to high-tensile-strength filaments or plastic filaments has proven to be particularly preferred with a fineness-related total tensile strength of at least 5 cN/dtex. Mostly the fineness-related maximum tensile strength is 8 cN/dtex and more. A fineness-related maximum tensile strength of at least 10 cN/dtex is most preferable. The fineness-related maximum tensile strength or also fineness strength denotes the maximum tensile strength of the filaments in question in N (Newtons) based on its filaments count in dtex. As steel filaments or steel strands have a fineness-related maximum tensile strength of typically 2 cN/dtex, the filaments used according to the invention have at least five times more tensile strength than steel (10 cN/dtex and more).

In fact, even high-tensile filaments are usually made with a fineness-related maximum tensile strength of in particular 20 cN/dtex and more and preferably with a maximum tensile strength of at least 30 cN/dtex. This even increases since tensile strengths of the filaments are available that are fifteen times those of steel (30 cN/dtex compared to 2 cN/dtex).

As a result, the grommet made from the yarns in question clearly has a greater breaking strength than to a grommet made of wire rope, as described in the state of the art according to DE 79 30 165. In addition, the plastic filaments used for the realization of the yarns or plastic yarns and thus of the ropes are designed in particular as thermoplastic yarns. Here one has recourse to plastics such as polyethylene (PE), polyamide (PA), polyethylene terephthalate (PET), polypropylene (PP) individually or in combination as special proven favorable. The list is of course not conclusive.

Such thermoplastic filaments typically have a density or a specific weight that is slightly smaller than that of water, so that the grommet made from it is buoyant as a whole. For example, for polyethylene (PE) densities of 0.92 to 0.95 g/cm$^3$ were observed. If you compare this density with that of steel, which is 7.85 to 7.87 g/cm$^3$, it becomes clear that the density of steel or a steel rope is almost eight times as high as that of the one used for making plastic ropes. At the same time, the fineness-related breaking strength is the plastic ropes used according to the invention are approximately fifteen times as large as those known steel ropes, so that overall the ratio of material weight/breaking strength in the according to the invention realized grommet in comparison to that of a grommet steel ropes is only 0.5.

This means that the grommet according to the invention has a mass or weight that is only half as large as that of a grommet made of steel ropes of the same breaking strength. As a result, handling of the grommets according to the invention is also clear facilitated and, depending on the design, additional hauling equipment can often be dispensed with. Rather, a user is usually able to handle the grommet on his own and for example to hang it in a hook, which would not be possible with a steel rope of the same breaking strength that would have over double the weight. The same applies, of course, to the chain according to the invention that is equipped with the inventive grommet links.

As a result, a grommet made of plastic ropes is provided that compared to a grommet made of steel ropes with the same breaking strength, has a significantly lower one weight (only approx. 50%), so it is accordingly much easier to handle. In addition, due to the use of one or more plastic ropes, manufacture of the grommet according to the invention means damage to the surface of a for example, the load-traction means is practically excluded. Furthermore, according to the invention, the grommet is in principle buoyant and can consequently be used in port operation and not get lost, for example. The same applies in the event that the grommet is used in offshore applications. On top of that, the grommet according to the invention and the chain made from it is weather-resistant and corrosion naturally does not show.

According to a further advantageous embodiment, the yarns are made of plastic filaments made of a polyolefin with an ultra-high molecular weight. In fact, the molecular mass of the polyolefin used in the context of the invention is at least 400,000 g/mol. In addition, the fineness of the filaments or filaments realized in this way is at least 20 dtex. Such plastic filaments made of a polyolefin with ultra high molecular weight and their production have long been known. Reference is made in this regard, for example, to EP 0 205 960 (U.S. Pat. No. 5,578,374). Corresponding products are on the market for example marketed as Dyneema7.

Another advantage to be taken into account is that the breaking strength of the ring of the grommets according to the invention or the link is equal to the sum of the individual rope breaking strengths reduced by a loss of laying force. In fact, the loss of laying force according to the invention is less than 20% and in particular less than 15% as well preferably approx. 10% of the sum of the individual rope breaking strengths. As a result, with the help of such a grommet, breaking strength realized—in contrast to the previous round link described—can be forecast and adjusted relatively precisely. This will be formed only by the sum of the individual rope breaking strengths. If at this point, for example six strands of rope are intertwined with one another, the measured breaking strength of the endlessly laid ring has six times the rope breaking strength of the single rope. Of this total, only the previously specified loss of laying force is then deducted. This allows the grommet to be defined in terms of its achievable breaking strength that is manufactured and adapted to the actual requirements. Of course, that also applies for each link made from the grommet.

In this way, links can be defined that have a breaking strength or have a breaking strength of at least 1 kN. Mostly even breaking strengths of 5 kN, in particular of 10 kN and preferably even those of at least 20 kN. The chain used in this way can be used for storage, securing, lifting and handling freight, cargo, but also using vehicles to advantage. The use of plastic filaments prevents any surface damage. In addition, the chain produced in this way is particularly weatherproof. This is where the main advantages can be seen.

BRIEF DESCRIPTION OF THE DRAWING

In the following, the invention is illustrated with reference to an illustrated embodiment described in more detail. Therein.

SPECIFIC DESCRIPTION OF THE INVENTION

Figure 2A:
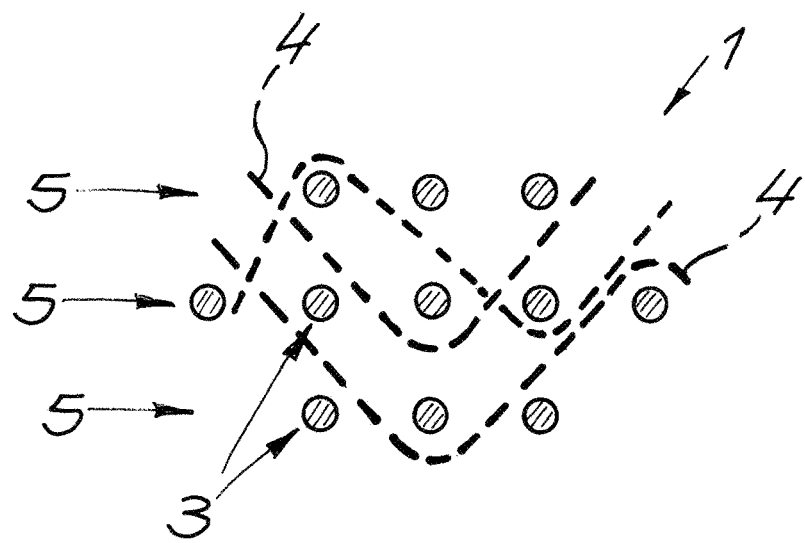
FIGS. 2A and 2B show two different variants of the rope used in cross-section.
Figure 2B:
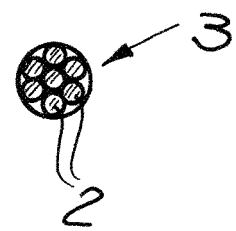
Figure 2B:
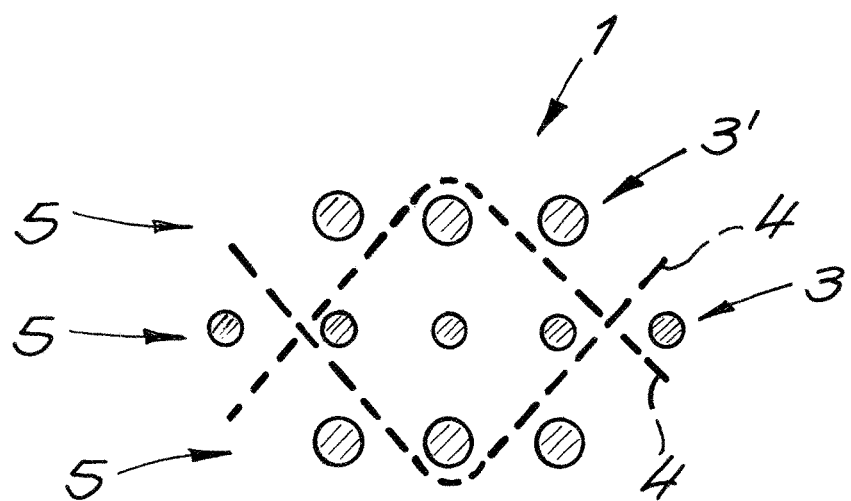
Figure 3:
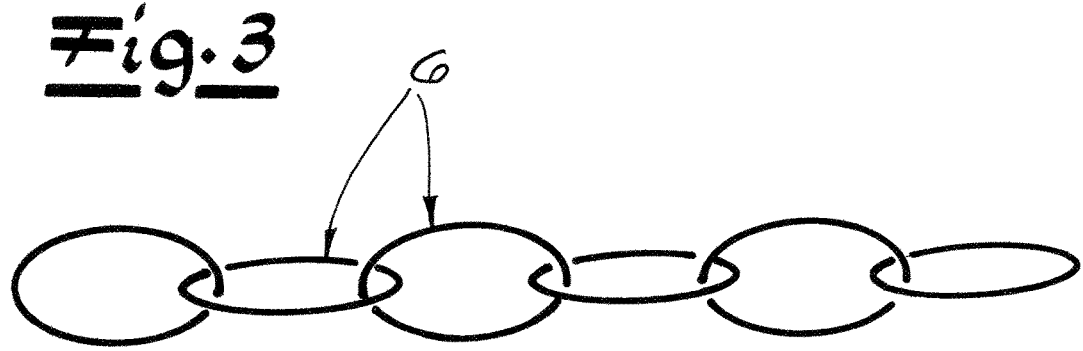
FIGS. 3 and 4 show the chain according to the invention in two basic variants.
Figure 4:
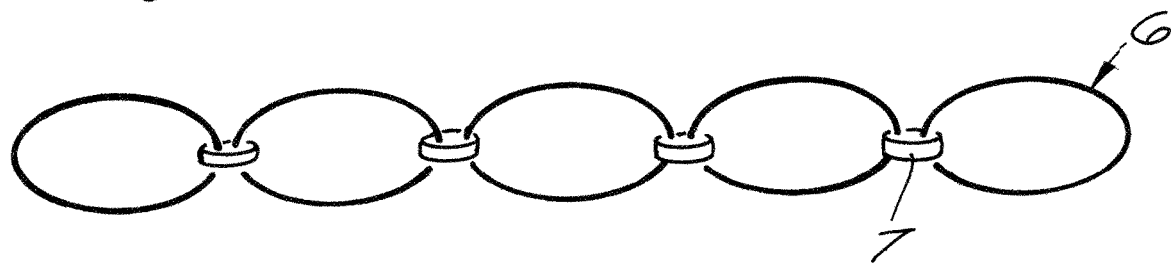

In each of FIGS. 1A to 2C, a grommet is shown having at least one endlessly laid ring of beaten laid rope. In principle, several rings can also be used. The grommet shown in detail FIGS. 1A to 2C is described in more detail below and is used according to the embodiment and as evidenced by FIGS. 3 and 4 to form a chain of interconnected links 6. The chain of FIG. 3 has individual links 6 connected to one another in such a way that the links 6 or the grommets interlock directly. The variant of FIG. 4, on the other hand, has individual links 6 that interlock indirectly via intermediaries such as the connectors 7. The connectors 7 can be steel rings, endless plastic bands or comparable connectors. The chain shown in FIGS. 3 and 4 can in principle be used for storage, securing, lifting and handling of freight, cargo, but also vehicles, as is generally known in the prior art referenced and described above in detail.

As already explained, each link 6 is designed as at least one endlessly laid rope ring made of plastic filaments and in particular as a grommet formed as shown in detail in FIGS. 1 and 2A to 2C. The rope 1 is formed by a core helically surrounded by a plurality of filaments or wires.

Figure 1A:
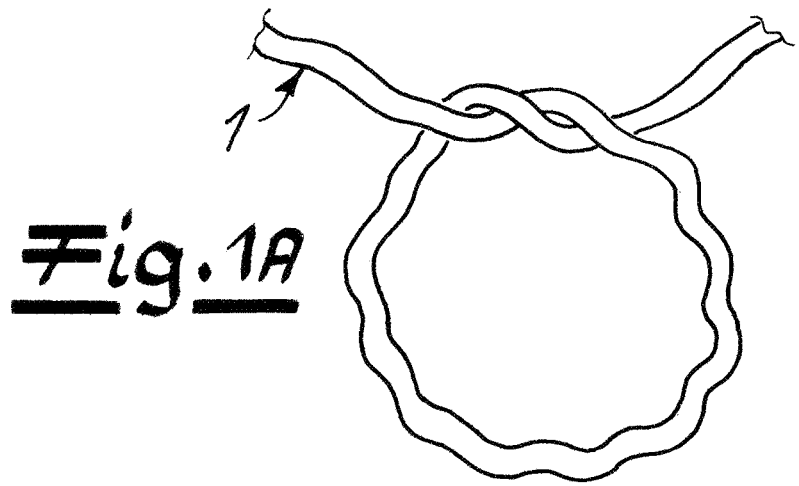
FIG. 1ABC show different steps in the manufacture of a grommet from an endlessly laid ring made of laid rope and consequently the production of a link.

According to the embodiment in FIGS. 1ABC, a single rope is used that is continuously wound helically around itself as the core. The two rope ends 1a and 1b that ultimately remain in this context in FIG. 1C each in the laying direction at the end of the laying process form an outer rope layer.

This means that the two rope ends 1a and 1b are engaged, as it were, under the outer rope layer into the interior the grommet and do not project outward, which in principle would also be possible.

FIG. 1A shows an S-twist. But a Z-twist can also be used. If several helically wound ropes for are employed, they can extend counterclockwise and clockwise with one covering the other according to the invention.

Figure 2C:
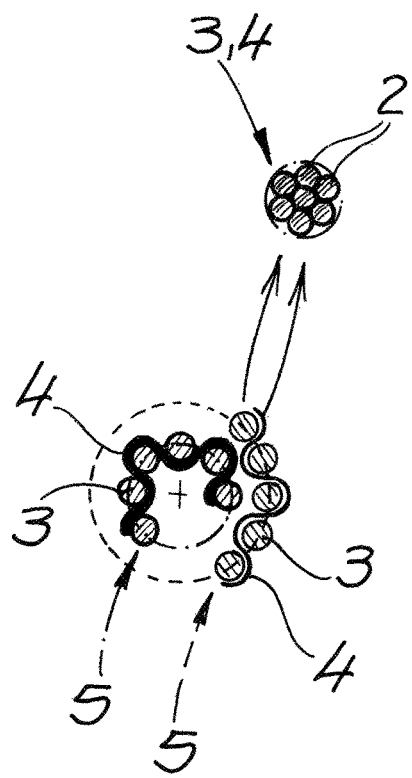
FIG. 2C shows a particularly preferred variant of the one used rope.

The rope 1 is itself comprised of plastic filaments 2, as can be seen in particular in the sectional detail views through the rope 1 in FIG. 2C. In fact, the rope 1 is basically a plastic rope, that is to say a rope 1 made of individual plastic filaments 2. The plastic filaments 2 for their part can be yarns or plastic strands 3 and 4. In this embodiment, the yarns 3 are warp yarns 3, while the yarns 4 are weft yarns 4.

The warp yarns 4 run predominantly longitudinally, here circumferentially of the ring of FIG. 1. In contrast, the weft yarns 4 are transverse to this orientation and run predominantly radially of the ring. To make the strands 2 from the filaments 3 and 4, the strands are twisted together in this embodiments as described above.

According to the embodiment, the warp yarns 3 shown in FIG. 2A all have the same diameter. The same applies to the weft yarns 4 in this variant, where the diameter corresponds to that of the warp yarns 3. As part of the variant of FIG. 2B, however, the warp yarns 3 are of different diameters, whereas in this variant again weft yarns of the same diameter is used. In fact, in FIG. 2B one can see warp yarns 3 with a relatively small diameter or cross-section, whereas in contrast, warp yarns 3' have a larger diameter.

Either way, the warp yarns 3, 3' in conjunction with the weft yarns 4 define a rope 1 made from plastic filaments 2. For this purpose, the rope 1 is laid to have a circular section, made of warp yarns 3 and 3' and weft yarns 4. The warp yarns 3 define in each case different layers 5 on top of one another, as indicated in FIG. 2A. In fact, three layers 5 on warp yarns 3 are used at this point that are interwoven with the respective weft yarns 4 and form a rope 1 of circular section. The braiding process can be detailed using a device or machine for circular weaving, as is described in detail by way of example in above-cited EP 0 059 483.

In the particularly preferred variant according to FIG. 2C for making the circularly braided rope 1, the procedure is such that one or more layers 5 each is formed of a tubular fabric from the warp yarns 3 or weft yarns 4. In fact, the circularly woven rope 1 is produced in this context in the course of a single- or double-tube weaving process. The tubular fabrics are in turn made up of the warp yarns 3 in the longitudinal direction and the weft yarns 4 running transversely on the other hand. In addition, an insert, not shown, may be used. The insert can be a core made of further unillustrated plastic filaments. Other cores are also conceivable.

According to this embodiment, the yarns 3 and 4 have a fineness of at least 20 dtex. In addition, yarns 3 and 4 are high-tensile yarns 3 and 4 with a fineness-related full tensile strength of at least 10 cN/dtex. The yarns 3 and 4 are plastic yarns 3 and 4 and in particular thermoplastic filaments. That is the individual plastic filaments 2 form yarns 3 and 4, the filaments 2 being made, for example, of PE, PA, PET, PP etc.

Plastic filaments 2 are very particularly preferred of polyolefin of ultra-high molecular weight, so-called UHM-WPE (ultra-high-molecular-weight polyethylene). Such plastic filaments 2 and yarns 3 and 4 made from them are, for example, sold under the brand name Dyneema7. The invention is of course not limited to this. In principle, plastic filaments 2 made of polyamide (PA) can also be used at this point or polyester or polyethylene terephthalate (PET). Combinations are of course also conceivable. That is, in this case the yarns 3 and 4 in question are made up of plastic filaments 2 of different plastics.

The breaking strength of the ring produced in this way is generally determined as the sum of the individual strand breaking strengths. That means each individual rope 1 has a corresponding breaking strength. If, for example, the maximum tensile strength related to the fineness is 10 cN/dtex and the rope 1 has a fineness of 20 dtex, the maximum tensile strength is 200 cN or 2N for that considered rope 1 (10 cN/dtex×20 dtx=200 cN). As a rule, however, one is working with a fineness of at least 100 dtex so that the maximum tensile strength of the rope 1 is 10 N.

Figure 1B:
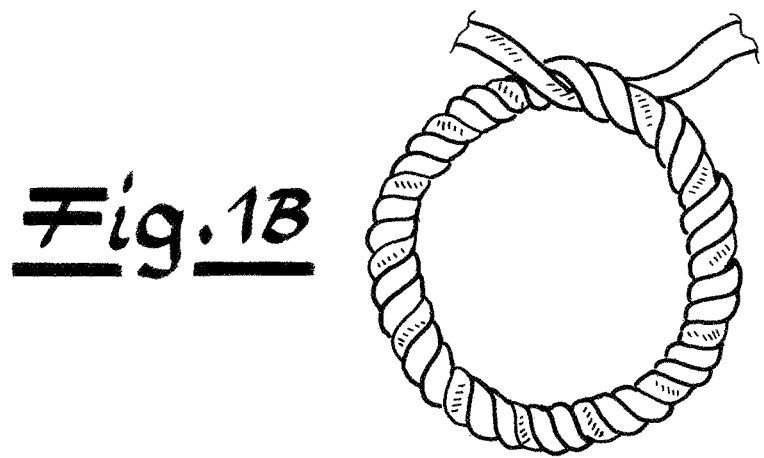
Figure 1C:
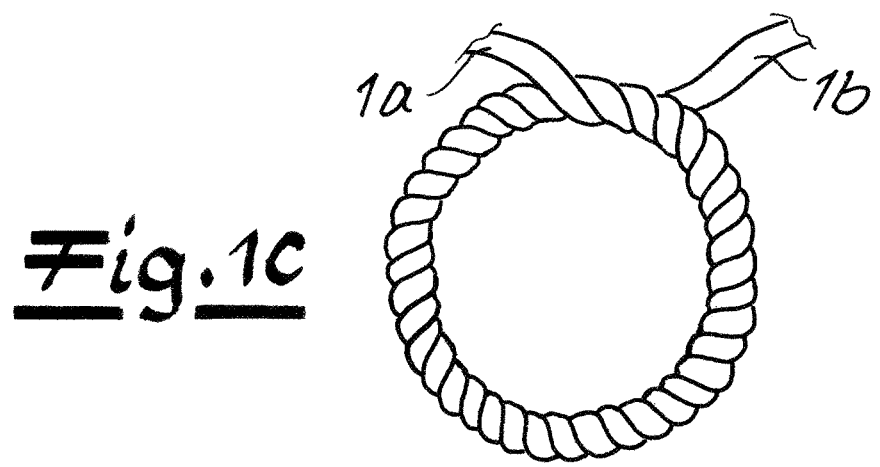

Typical rope diameters of 4 mm, for example, lead to a strength of mostly more than 100 N, so that if, for example, six ropes 1 are used for the embodiment of FIGS. 1A-C a breaking strength of at least 600 N is obtained. From this sum a loss of laying force must then be deducted from the individual rope breaking strengths in order to be able to determine and establish overall the breaking strength of the ring. The loss of laying force is typically about 10% of the above-mentioned sum (i.e. 10% of 600 n=60 n), so that in the example, a breaking strength of the ring of at least 500 n can be assumed.

The breaking strength of ring forming the link 6 is therefore the same as for the chain as a whole.

The invention claimed is:

1. A chain comprised of interconnected links each formed by at least one endlessly and continuously circularly woven sheath of tubular shape and circular cross section made of plastic warp yarns and plastic weft yarns surrounding a core, the plastic warp and weft yarns being made of filaments of high tensile strength with a fineness-related maximum tensile strength of at least 5 cN/dtex.

2. The chain according to claim 1, wherein the plastic warp and weft yarns are multifilament yarns made of plastic filaments.

3. The chain according to claim 1, wherein the plastic warp and weft yarns are formed from thermoplastics based on polyethylene, polyamide, polyethylene terephthalate, or polypropylene.

4. The chain according to claim 1, wherein the plastic warp and weft yarns are made from an ultra-high molecular weight thermoplastic polyolefin.

5. The chain according to claim 1, wherein a fineness of the plastic warp and weft yarns is at least 20 dtex.

6. The chain according to claim 1, wherein ends of an outer layer of the sheath are braided in a direction of lay.

7. The chain according to claim 1, wherein the links have a tensile or breaking strength of at least 1 kN.

8. The chain according to claim 1, wherein the links interlock directly or are coupled to one another by connectors.

9. A method comprising providing the chain according to claim 1 for storing, securing, lifting, and handling cargo and vehicles.

* * * * *